July 21, 1953  F. O. JOHNSON  2,646,487
CONTROL DEVICE
Filed Feb. 1, 1949  3 Sheets-Sheet 1
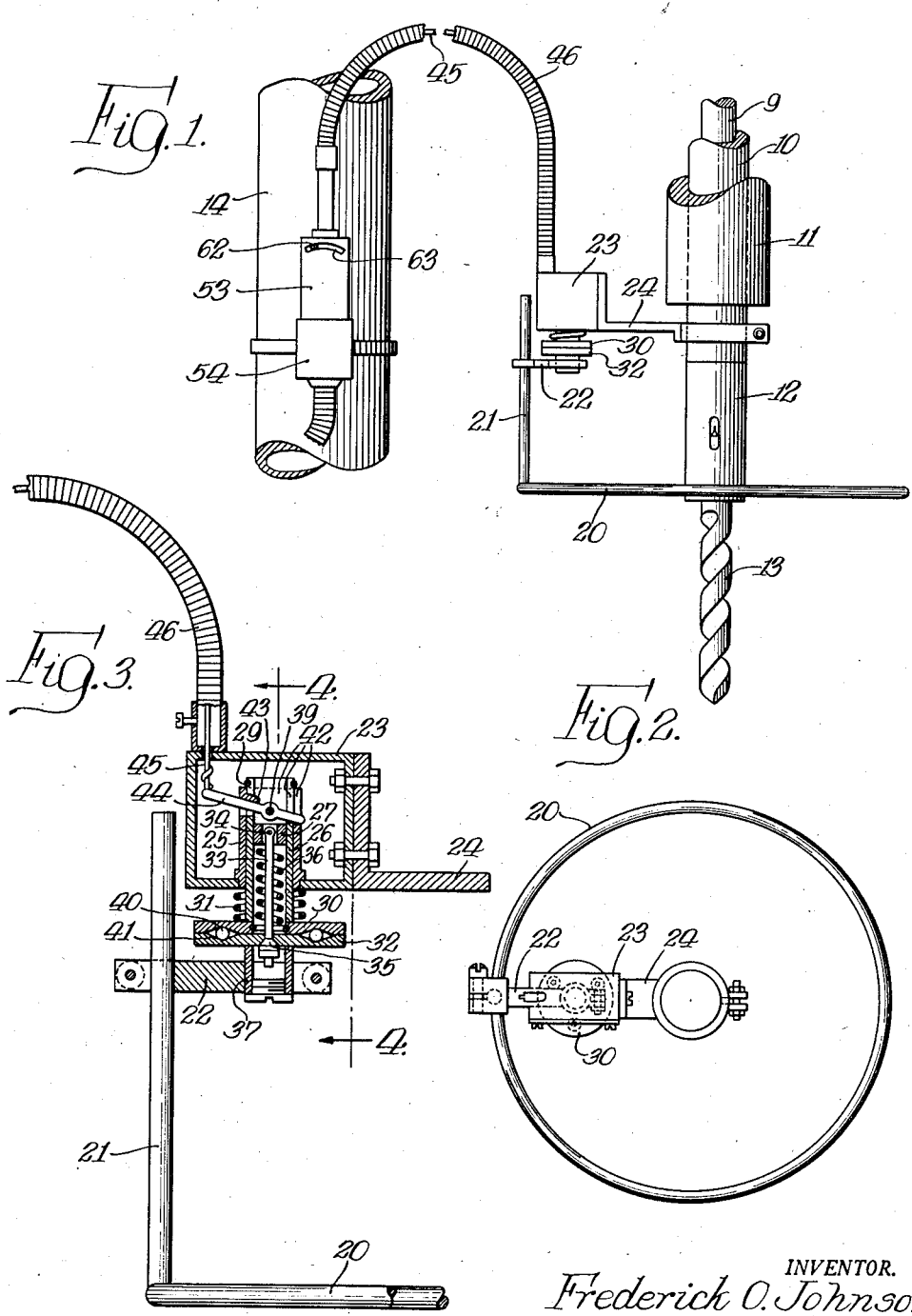
INVENTOR.
Frederick O. Johnson,
BY
Davis, Lindsey, Hibben + Noyes
Attys.

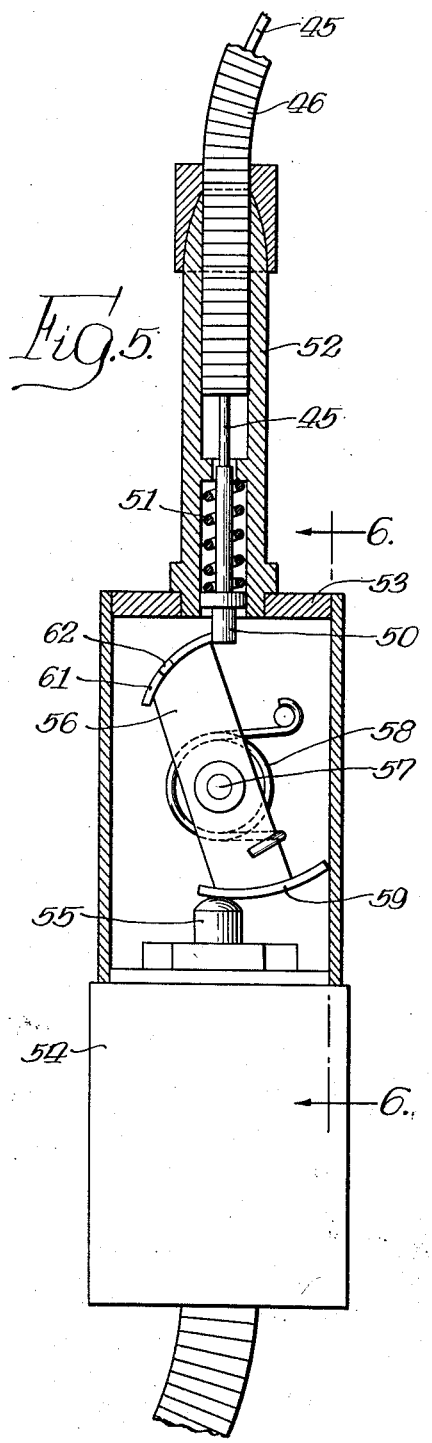
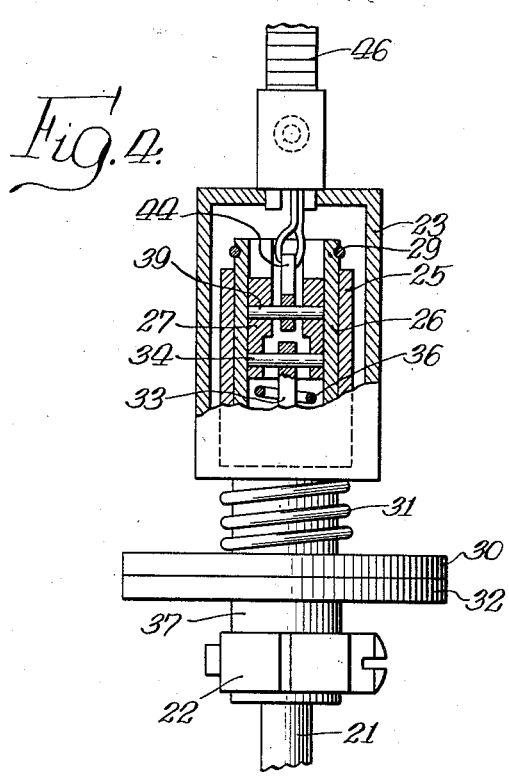
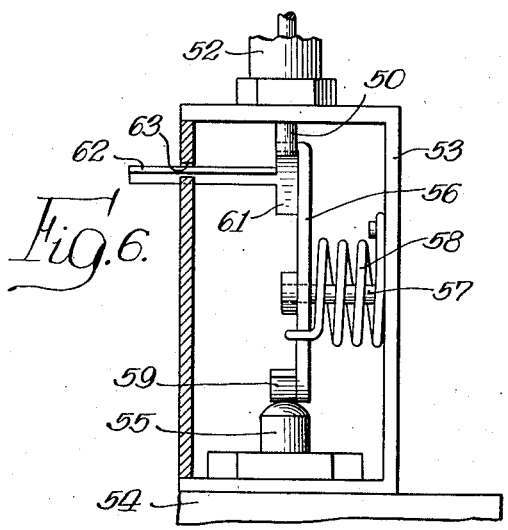

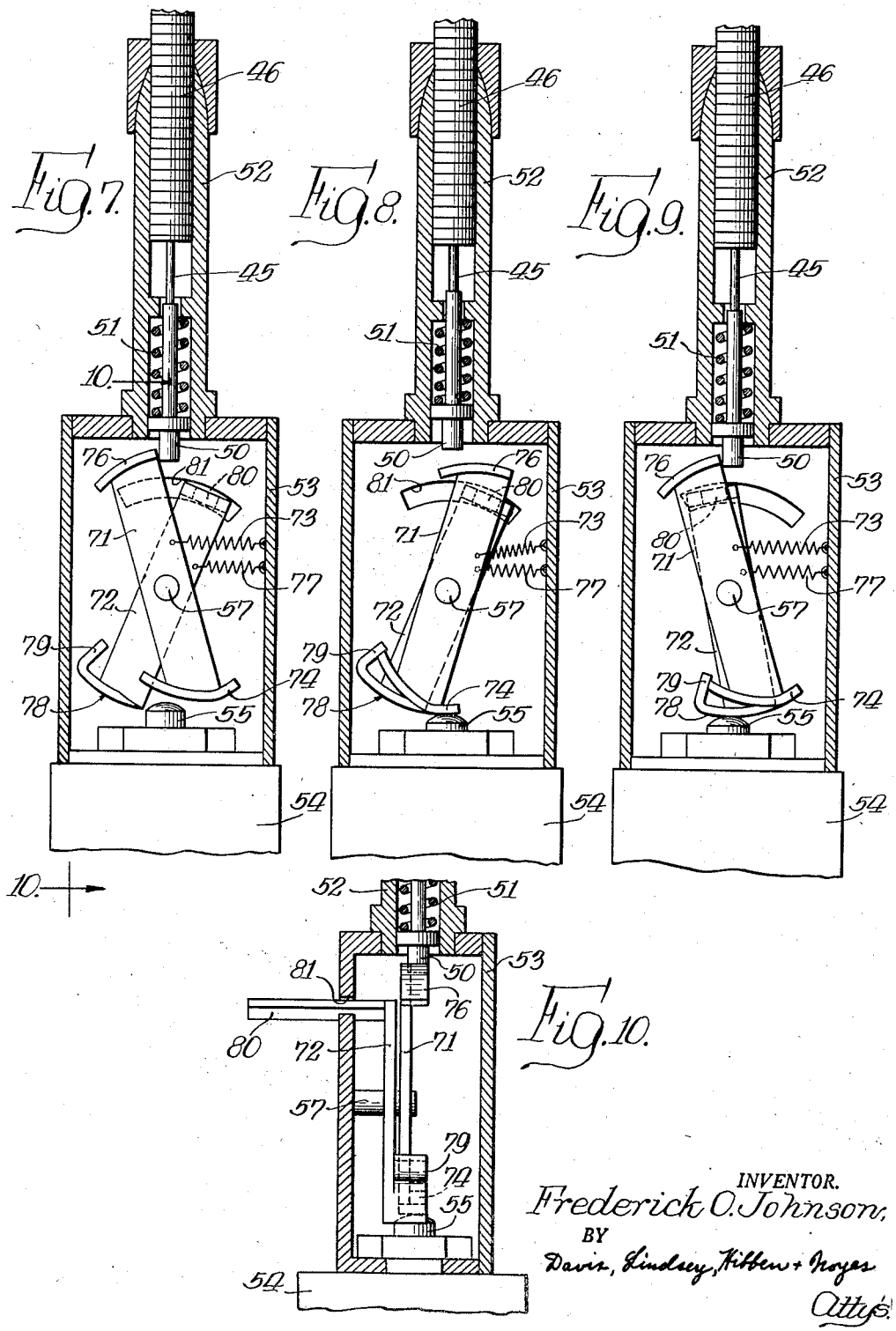

Patented July 21, 1953

2,646,487

UNITED STATES PATENT OFFICE 2,646,487

CONTROL DEVICE

Frederick O. Johnson, Chicago, Ill.

Application February 1, 1949, Serial No. 74,008

8 Claims. (Cl. 200—169)

This application is a continuation-in-part of my copending application Serial No. 673,679, filed May 31, 1946, Patent No. 2,482,487, September 20, 1949.

This invention relates generally to control devices and more particularly to a device for controlling the operation of a moving part of a machine, the device being adaptable either for controlling the normal operation of the moving part or as a safety device to stop operation of the part in an emergency.

Various control devices of the foregoing general type have been proposed in the machine tool and related arts, but the utility of such devices has often been limited to certain special situations and the devices in many cases have been characterized by undesirable or disadvantageous operating features. For example, some control devices heretofore suggested are not sufficiently sensitive to function satisfactorily either as a normal operating control or as a safety device. Other previously suggested control devices possess the disadvantage that they may be actuated to effect the desired control by movement of a contact member in only a certain direction or in only a certain manner. Moreover, many of such control devices are not sufficiently flexible in design to permit their installation on existing machines or to be adjusted readily to meet changing operating requirements.

Accordingly, the general object of my invention is to provide a novel combination of an electric switch, adapted to control the operation of a moving machine part, and a mechanism for controlling the operation of the switch, said combination being free from the aforementioned operational disadvantages and being of such flexible and adjustable design as to find ready application to a wide variety of control problems.

Another object of the invention is to provide a novel device of the class described including an electric switch and a mechanism for controlling the operation of the switch which is highly sensitive both from the standpoint of requiring the application of only a relatively small force against a contact member to cause actuation of the control mechanism and from the standpoint that movement of the contact member in any direction or in any manner through only a small distance will effect such actuation.

A further object of the invention is to provide a novel device of the class described which is non-blockable, i. e. which cannot readily be rendered inoperative or incapable of accomplishing the desired control by deliberate or improper manipulation of the device.

Still another object of the invention is to provide a novel device of the foregoing character which includes a microswitch as a control element and mechanical means for operating the switch, such mechanical means being highly effective to perform its function and yet being of simplified and inexpensive construction.

Other objects and advantages will become apparent from the following description taken in connection with the accompanying drawings, in which:

Figure 1 is a fragmentary view of a drill press provided with a control device embodying the features of the invention;

Fig. 2 is a plan view of a portion of the control device shown in Fig. 1;

Fig. 3 is an enlarged vertical sectional view of a portion of the control device shown in Fig. 1;

Fig. 4 is an enlarged vertical sectional view taken substantially on the line 4—4 of Fig. 3;

Fig. 5 is a vertical sectional view of another portion of the control device shown in Fig. 1;

Fig. 6 is a vertical sectional view taken on the line 6—6 of Fig. 5;

Fig. 7 is a view similar to Fig. 5 but showing a modified form of the device with a switch operating element in normal operating position;

Fig. 8 is a view similar to Fig. 7 but showing the switch operating element in released position;

Fig. 9 is a view similar to Figs. 7 and 8 but showing the switch operating element in the process of being reset; and Fig. 10 is a vertical sectional view taken on the line 10—10 of Fig. 7.

As mentioned above, a control device embodying the features of the invention is adapted either for controlling the normal operation of a moving part of a machine or as a safety device to stop operation of the part in an emergency. When utilized in the first manner, the device comprises an automatic means for operating an electric switch to effect reversal, stoppage, or a change in speed of a given moving part or to effect the movement of some other part of the machine at a certain stage in the movement of the given part. When used as a safety means, the device is adapted to be actuated either intentionally by the operator of the machine or merely by being engaged as an incident to the involuntary actions of the operator should he find himself endangered by having his clothing or a portion of his body caught in the machine. In the present instance I have illustrated the device as of the latter type.

To give an understanding of the invention, I have shown the device for use in connection with a drill press, of which only fragmentary parts are shown. Thus, in Fig. 1, the parts of the drill press illustrated comprise a spindle 9 mounted in a quill 10 carried in a head 11 and provided with a chuck 12 to receive a drill 13. A machine of this character usually includes a column 14 for supporting the quill and spindle in movable relation to the column.

When embodied in this form, the invention includes a contact member placed in close proximity to the cutting tool, which, in this instance, is the drill 13, the contact member being movable in all directions so that any engagement therewith by the operator, whether intentional or involuntary, will be transposed into such movement as will actuate an electric switch to stop both rotary and feeding movements of the drill 13.

The means for so translating the movements of the contact member comprises generally a control element movable in a predetermined direction and a pair of members which are movable independently of each other or conjointly with each other upon any form of movement of the contact member to effect movement of the control element in the predetermined direction. The pair of members are preferably concentrically arranged for sliding movement in either direction, either jointly or separately, and effect operation of a lever connected to the control element always is one direction.

In the specific embodiment shown in the drawings, the contact member takes the form of a ring 20 surrounding the drill 13 at a point where it will not interfere with normal operation of the drill press but may be readily contacted by the operator in an emergency. Other forms of contact member than a ring, of course, could be provided, but with a ring the contact member extends all the way around the drill and thus may be engaged from any angle. The ring 20 is provided with an upright portion 21 at its rear adjustably secured by a clamp 22. The clamp 22 is adapted to be connected to one of the two movable members so that separate or conjoint movement of the movable members will be effected for any movement of the ring 20.

The movable members are preferably carried in a casing 23 adjustably mounted by means of a bracket 24 on the quill 10 of the drill press to move therewith during the feeding of the drill. The casing 23 is provided with a fixed sleeve 25 (see Fig. 3) in which the movable members are mounted. The movable members, in the present instance, comprise a second sleeve 26 slidably mounted within the fixed sleeve 25 and a generally cylindrical member 27 slidably mounted within the second sleeve 26. The second sleeve terminates at its lower end in a flange 30 urged downwardly by a spring 31 interposed between the flange 30 and the casing 23. A spring ring 29 may be utilized on the upper end of the sleeve 26 to limit the downward movement effected by the spring 31. The cylindrical member 27 has a universal connection with a disc 32 held in engagement with the lower face of the flange 30 by such universal connection. The universal connection in the present instance comprises a rod 33 pivotally connected at its upper end, as at 34, to the cylindrical member 27. The lower end of the rod 33 is provided with a spherical nut 35 engaging a similarly shaped pocket in the lower face of the disc 32. The nut 35 is held in tight engagement with the disc 32 and the latter is held in engagement with the flange 30 by means of a spring 36 mounted within the second sleeve 26 and bearing at one end against the cylindrical member 27 and at the other end against the disc 32.

To so connect the members 26 and 27 with the contact ring 20 as to cause movement of one or both of the members upon movement of the ring, the disc 32 is provided with a central hollow stud 37 extending downwardly from its lower face and adjustably secured in the clamp 22. The flange 30 and the disc 32 are provided with a plurality of balls 40 (see Figs. 2 and 3) positioned in conical pockets 41 in the opposed faces of the flange and disc so that relative rotation between the flange and disc will cause separation thereof to the extent of the diameter of the balls 40 and thus will effect movement of one of the two members 26 and 27 relative to the other.

The upper ends of the two members 26 and 27 as well as the fixed sleeve 25 are provided with aligned transverse slots, indicated at 42. The slots in these parts are held in alignment by means of a lug 43 bent inwardly from the fixed sleeve 25 to extend into the slots in the two members 26 and 27. Extending transversely through the slots 42 is a lever 44 pivotally connected to the inner cylindrical member 27 as at 39. The lever 44 is connected to a Bowden wire 45 extending from the casing 23 through an armored cable 46 to actuate the switch, the Bowden wire in this instance constituting the control element and adapted to effect actuation of the switch when tensioned.

The Bowden wire 45, at its other end, is connected to a detent 50 (see Figs. 5 and 6), which is urged into its holding position by a spring 51, the detent 50 and spring 51 being mounted in a tube 52 extending upwardly from a casing 53 mounted on some fixed part of the drill press, such as the column 14. The detent 50 normally is in its holding position and serves to hold a spring-actuated means for operating a switch. In the present instance, the switch, which may be of the micro-switch type, is carried in a casing 54 and is provided with a push button 55 extending upwardly into the casing 53.

The means for operating the push button 55 when the detent 50 is withdrawn preferably comprises a lever 56 pivotally mounted intermediate its ends on a stud 57 rigid with the casing 53. The lever 56 is adapted to be spring operated and, to this end, is provided with a torsion spring 58 wrapped around the stud 57 and engaging the lever 56 at one end and secured at its other end to the casing 53. The lever 56, at its ends, is provided with flange portions, the flange portion at the lower end, indicated at 59, having its outer surface constituting a cam for actuating the push button 55 when the spring 58 causes rocking movement of the lever 56. The flange portion at the upper end of the lever 56, indicated at 61, is adapted to be engaged by the detent 50 to prevent swinging of the lever 56. When the detent 50 is withdrawn, the torsion spring 58 causes the lever to swing in a clockwise direction to depress the push button 55 and thus actuate the switch within the casing 54. The flange 61 at the upper end of the lever 56 also functions as a cam, when moved counterclockwise, to force the detent 50 upwardly for resetting the device. The flange 61 is provided with a forwardly extending handle 62 projecting through a slot 63 in the casing 53 so that the lever 56 may be readily reset.

In operation, the action of the two members 26 and 27, when the ring 20 is moved in any manner, is such as to cause tensioning of the Bowden wire 45 and thus release the detent 50 to effect operation of the switch. Thus, should the ring 20 be moved in such a manner as to cause rotation of the disc 32 relative to the flange 30, the balls 40 held between the disc and the flange will cause separation of the disc 32 and flange 30. If such separation results only in downward movement of the disc 32, the inner member 27 is pulled downwardly by means of the rod 33, and the lever 44 will thereby be swung downwardly to tension the Bowden wire 45. In such case, the lever 44 will be fulcrumed on the right-hand portion of the fixed sleeve 25, as illustrated in Fig. 3. Should such separation between the flange 30 and disc 32 result only in forcing the flange 30 upwardly against the pressure of the spring 31, the second sleeve member 26 will be forced upwardly to engage the lever and cause it to pivot on its pivotal connection 39 with the inner member 27 to tension the Bowden wire. Should separation of the disc 32 and flange 30 result in both downward movement of the disc 32 and upward movement of the flange 30, a similar pivotal movement of the lever 44 will thereby be effected, the pivotal connection of the lever with the inner member 27, of course, being drawn downwardly in this instance.

Should there be such movement of the ring 20 as to cause downward movement of the disc 32 without rotation, the lever 44 will be drawn downwardly by the inner member 27 with the right-hand portion of the fixed sleeve 25 functioning as the fulcrum for the lever. In this instance, when the disc 32 is moved downwardly, the spring 31, of course, similarly tends to move the flange 30 downwardly, but such movement of the flange and the second sleeve 26 will have no effect on the lever 44. Should the flange 30 and the disc 32 be moved upwardly by movement of the ring 20, both the members 26 and 27 will move upwardly, and such movement of the member 27 will cause the lever 44 to swing in a direction to tension the Bowden wire, since the lever will then fulcrum on the lug 43 of the outer casing which extends into the slots 42.

Other movements of the ring 20 may tend to cause the disc 32 to tilt relative to the flange 30, but in all movements of the inner member 27 or outer member 26, independently of each other or conjointly, the lever 44 will be caused to move in a direction to tension the Bowden wire 45 and thus effect operation of the push button 55 of the switch, as heretofore described.

The switch contained within the casing 54 may be in the main line of the electrical circuit utilized in operating the drill press and may be adapted to be opened when the push button 55 is actuated, or the switch may be adapted to be closed on such operation of the push button in order to actuate a relay, resulting in control of the electrical circuit for the machine.

The switch actuating lever 56 which is shown in Figs. 5 and 6 may be manually reset, in the manner hereinbefore described, by means of the handle 62 projecting outwardly from the upper end of the lever through the slot 63 in the casing 53. Although such a reset means is simple and highly satisfactory in operation, it is possible for an operator to deliberately block or obstruct the normal operation of the lever 56 by tieing or otherwise securing the handle 62 to prevent release and pivotal movement of the lever 56 when the detent 50 is drawn upwardly by the Bowden wire 45. In order to eliminate this possibility of misoperation of the control device, I have provided a modified or non-blockable form of reset mechanism which is illustrated in Figs. 7 to 10, inclusive.

In this non-blockable form of the invention the stud 57 has mounted rotatably thereon a switch actuating lever 71 and a separate and independent reset lever 72 adapted to coact with the lever 71. The lever 71 is spring-operated by means of a tension spring 73 connecting the lever 71 with the casing 53 whereby to urge rotation of the lever in a clockwise direction. The lever 71 is also provided with flange portions 74 and 76 at its opposite ends, the flange portion 74 at the lower end of the lever constituting a cam surface for depressing the push button 55, and the flange portion 76 at the upper end of the lever constituting a cam surface for urging the detent 50 upwardly to permit retention of the lever 71 in cocked position by the detent in the same manner as described in connection with the form of the invention illustrated in Figs. 5 and 6. The upper flange portion 76, however, is not provided with a handle for direct resetting of the lever 71.

The reset lever 72, which is rotatably mounted on the stud 57 adjacent the lever 71, is also spring-operated by means of a tension spring 77 connecting the lever with the casing 53 whereby the lever 72 is also rotatably urged in a clockwise direction. The lower end of the lever 72 is provided with a flange 78 also constituting a cam surface adapted to depress the push button 55 and having an upturned end portion 79 adapted to coact with one end of the flange 74 for resetting the lever 71 in the manner hereinafter described. A handle 80 projects outwardly from the upper end of the lever 72 through an arc-shaped slot 81 in the casing 53.

In operation, the lever 71 is normally retained in cocked or set position by engagement of the detent 50 with the flange 76, as seen in Fig. 7, the spring 73 being thereby energized or placed under tension. The lever 72 is normally retained by the spring 77 with the cam surface on the flange 78 out of engagement with the push button 55, as also seen in Fig. 7. When the detent 50 is drawn upwardly by tensioning of the Bowden wire 45, in the manner heretofore described, lever 71 is thereby released and rotates clockwise to the position shown in Fig. 8 whereby the cam surface of the flange 74 depresses the push button 55 to actuate the switch.

To reset the switch actuating mechanism, the lever 72 is swung counterclockwise by movement of the handle 80 to the opposite end of the slot 81, as shown in Fig. 9. By thus rotating the lever 72, the upturned end portion 79 of the flange 78 engages the adjacent end of the flange 74 and the lever 71 is thereby simultaneously rotated in a counterclockwise direction, the cam surface of the flange 76 coacting with the detent 50 to raise the latter upwardly whereby to reset the lever 71 in cocked position for normal operation of the device. During rotation of the lever 72 for resetting the lever 71, the cam surface of the flange 78 moves into engagement with the push button 55 to replace the cam surface of the flange 74 as the latter swings away from the push button, whereby the push button 55 is continuously retained in depressed position until the lever 72 is released to be returned to its normal position by the action of the spring 77.

It will be seen that the machine cannot be operated except when lever 71 is reset to its normal cocked position and lever 72 is released to return it to its normal position. In any other position of the levers 71 and 72, the switch button 55 will be depressed by either the flanges 74 or 78 so that the electric circuit supplying power to the machine is broken. This form of resetting mechanism may, therefore, be characterized as non-blockable since the device cannot be rendered ineffective or inoperative merely by deliberate tying or blocking of the handle 80.

With a device constructed in the manner heretofore described, high sensitivity is obtained both from the standpoint of requiring only a small force acting on the ring 20 to result in actuation of the switch and from the standpoint of requiring only a relatively small movement of the ring 20 to result in such actuation. Movement of the ring 20 in any direction or in any manner results in actuation of the switch, the structure for translating any such movement of the ring 20 being simple in character and inexpensive to manufacture, as will be apparent from the foregoing description. The device may be readily applied to an existing machine since the casing 53 may be easily secured to the quill or other moving part of the machine while the switch casing 54 may be mounted at any convenient location and the switch may be readily connected into the electrical circuit in any desired manner.

Although the invention has been described in detail with reference to certain specific structural embodiments, it will be understood that various modifications and equivalent structures may be employed without departing from the scope of the invention as defined in the appended claims.

I claim:

1. In a control device of the character described, the combination of a switch, a spring-operated actuator for said switch, shiftable retaining means normally holding said actuator against movement, a contact element movable in all directions, and means actuated by movement of said contact element in any direction for shifting said retaining means to release said actuator whereby to operate the switch.

2. In a control device of the character described, the combination of a switch, a spring-operated actuator for said switch, shiftable retaining means normally holding said actuator against movement, a contact element movable in all directions, and means actuated by movement of said contact element in any direction for shifting said retaining means to release said actuator whereby to operate the switch, said last-named means being spring-actuated to return the same to its initial position after said shifting movement of said retaining means.

3. In a control device of the character described, the combination of a switch having a push button, an elongated lever having a pivotal support engaging the lever intermediate its ends for rotary movement thereof about said support, spring means tending to rotate said lever, said lever having transversely extending curved flange portions at its ends with the flange portion at one end providing a cam surface for operating said push button, a shiftable spring-pressed detent normally in extended position engaging the flange portion at the other end of said lever for preventing rotation of said lever and being retractable for releasing said lever, and spring means coacting with said detent for returning the latter to its extended position, said flange portion at said other end providing a cam surface for moving the detent against the action of said last-mentioned spring means whereby to reset said detent.

4. The combination recited in claim 3 further characterized in that said lever is provided with a handle extending outwardly adjacent one end thereof to permit manual rotation of the lever for resetting the same.

5. In a control device of the character described, the combination of a switch, a spring-operated actuator for said switch, shiftable means normally holding said actuator against movement, and a spring-operated reset member normally held out of engagement with said actuator, said reset member being adapted to engage said actuator for resetting the latter and being adapted to return to normal disengaged position upon release thereof.

6. In a control device of the character described, the combination of a switch, a spring-operated actuator for said switch, shiftable means normally holding said actuator in non-actuating position, and a spring-operated reset member normally held in released position out of engagement with said actuator and adapted to engage said actuator for resetting the latter, said reset member also having means for actuating said switch during resetting of said first-mentioned actuator whereby actuation of said switch is effected except when said first-mentioned actuator is in its normal reset position and said reset member is in its normal released position.

7. In a control device of the character described, the combination of a switch having a push button, a pair of rotary members each having cam surfaces adapted to depress said button, spring means tending to rotate said members, shiftable means for normally holding one of said members against rotation with its cam surface out of engagement with said button, the other of said members being normally held by said spring means with its cam surface out of engagement with said button, means on said other member for engaging said one member to rotate the latter in response to rotation of said other member, and a handle on said other member for manually rotating the same whereby to reset said one member, said other member upon release thereof being returned to its normal position by the action of said spring means.

8. In a control device of the character described, the combination of a switch having a push button, a first lever pivotally mounted intermediate its ends, shiftable retainer means cooperable with said first lever, a spring tending to rotate said first lever, flange portions at the opposite ends of said first lever, the flange portion at one end of said first lever comprising a cam surface for depressing said push button and the flange portion at the other end comprising a cam surface for resetting said retainer means and being normally engaged by said retainer means for holding said first lever against rotation, a second lever pivotally mounted intermediate its ends, a spring tending to rotate said second lever, a flange portion at one end of said second lever comprising a cam surface adapted to depress said push button and normally held out of engagement with said button, said flange portion on said second lever being engageable with the flange portion at said one end of said first lever for rotating the latter to normal position upon rotation of said second lever, and a handle at the opposite end of said second lever for rotating the same whereby to reset first lever and whereby said push button is in non-depressed position only when said levers are in their normal positions with their respective cam surfaces out of engagement with said button.

FREDERICK O. JOHNSON.

References Cited in the file of this patent

UNITED STATES PATENTS

| Number | Name | Date |
|---|---|---|
| 883,273 | Avery | Mar. 31, 1908 |
| 1,289,955 | Swift | Dec. 31, 1918 |
| 1,902,765 | Deitsch | Mar. 21, 1933 |
| 2,222,101 | Johnson | Nov. 19, 1940 |